Feb. 20, 1951  J. A. JOHNSON  2,542,871
PROCESS OF MAKING NONSKID TIRES

Filed Feb. 14, 1949

INVENTOR
JOSEPH A. JOHNSON
BY Joseph K. Schofield
ATTORNEY

Patented Feb. 20, 1951

2,542,871

UNITED STATES PATENT OFFICE 2,542,871

PROCESS OF MAKING NONSKID TIRES

Joseph A. Johnson, Windsor, Conn.

Application February 14, 1949, Serial No. 76,259

3 Claims. (Cl. 154—14)

1

This invention relates to automotive vehicle tires and more particularly to means for and method of providing an inflatable tire with non-skidding surfaces on its tread.

A primary object of the invention is to provide a tire for use on automotive vehicles that will have embedded in its outer or road contacting surface elongated finely shredded metallic material such as steel wool, the metal shreds of which are of extremely light weight and are bonded or vulcanized to the rubber of the tread during the initial production of the complete tire or during a retreading operation.

Another object of importance of the invention is that a strip of steel wool having fine, elongated and closely intermeshing shreds of steel is molded into the tire tread so that most of the shredded material is closely adjacent the outer or road engaging surface so that the shreds of steel will contact with and give a non-skidding surface or a large number of small separated surfaces on the tread of the tire.

Another object of the invention is to provide a novel method of retreading a worn tire in a manner to provide a long wearing non-skidding outer surface on the tread.

With the above and other objects in view the invention may include the features of construction and operation set forth in the following specification and illustrated in the accompanying drawing.

In the accompanying drawing annexed hereto and forming a part of this specification, I have shown the invention embodied in a retreaded tire and also show the present preferred process of retreading a worn tire, but it will be understood that the invention can be otherwise embodied and that the drawing is not to be construed as defining or limiting the scope of the invention, the claims appended to this specification being relied upon for that purpose.

2

Figure 5:
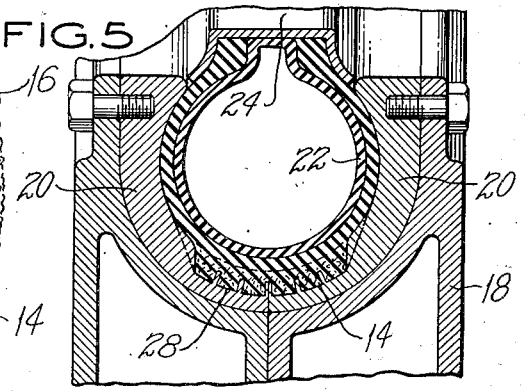

Fig. 5 is a tire in its mold after closing the rings and during the vulcanizing process.

In the above mentioned drawing, there has been shown but one embodiment of the invention which is now deemed preferable, but it is to be understood that changes and modifications may be made within the scope of the appended claims without departing from the spirit of the invention.

Briefly and in its broadest aspect, the invention comprises a tire to the tread of which has been embodied during manufacture or during a retreading operation a mass of intermingled shredded steel strips or steel wool, these strips or steel wool being molded into the tire with the rubber tread material.

Figure 3:
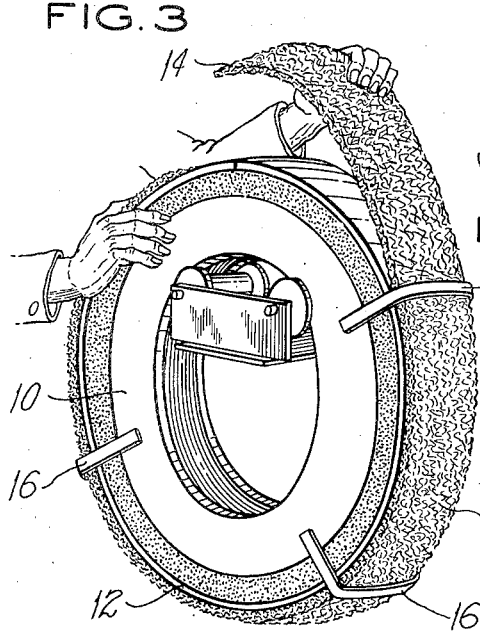
Fig. 3 is a perspective view of a tire in the process of assembling its parts preparatory to its being vulcanized.

Referring more in detail to the figures of the drawing and first to Fig. 3 there is shown a complete tire body or shoe 10 which may be an automotive tire the tread of which has become worn. Preferably the tire body or shoe 10 is first abraded to remove the remains of the worn tread and leaving a rough but clean rubber surface for the retreading operation. Over this tire shoe thus prepared is wrapped a strip of partially vulcanized rubber 12, this strip 12 being attached to the shoe or body portion 10 throughout its surface preferably by means of rubber cement so that the strip or "camel-back" will be retained properly and securely in place preparatory to being placed in the mold.

Surrounding this strip of partially vulcanized rubber 12 is loosely wrapped a length of shredded steel 14 as shown in Fig. 3. This material is familiarly known as steel wool and is prepared in the form of loosely intermeshing fine shreds of steel, the width of the strip 14 being sufficient to cover the width of the tread portion of the tire 10. This strip of steel wool 14 may be strapped to the tire around the camel-back by widely spaced transversely extending rubber bands 16 the ends of which may be cemented to the side walls of the tire 10.

Figure 2:
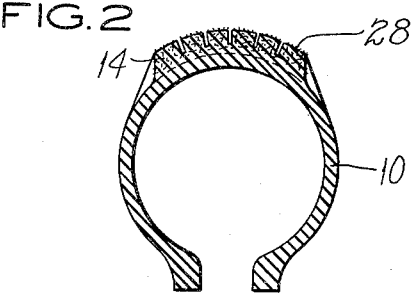
Fig. 2 is a cross sectional view of the tire shown in Fig. 1 made according to and embodying the present invention.
Figure 4:
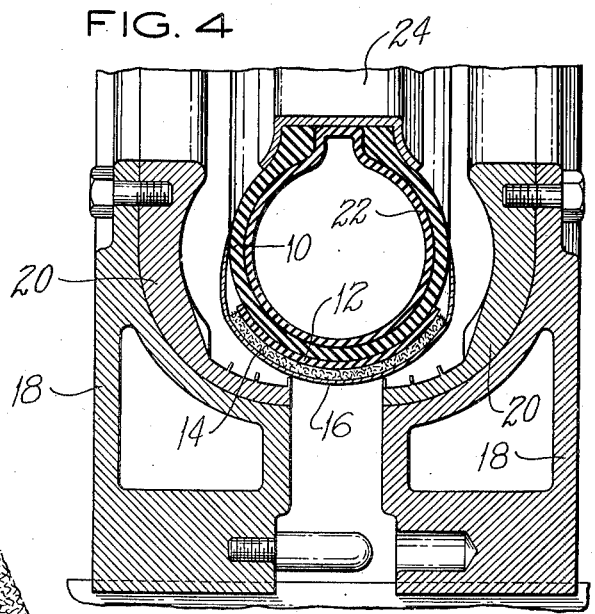
Fig. 4 is a cross sectional view of a tire positioned within its mold prior to closing the mold rings.

The tire 10 with the camel-back 12 and strip of loosely intermeshing steel wool 14 in place thereon is then placed in a mold 18 having the desired tread surface cut into annular matrix sections 20 mounted in the ring members 18 within the molding machine. An inflatable bag 22 is then placed within the tire 10 and with the mold rings closed and the expansible steel rim 24 inserted pressure is applied to within the bag 22. Heat is then applied to the hollow mold rings 18 so that the semi-vulcanized material forming the camel-back 12 is softened and melted sufficiently to permit the material forming the camel-back to flow into the tread recesses in the mold matrices 20. Heat and pressure are continued long enough to complete the vulcanization of the new tread material formed by the camel-back 12 during which the steel wool 14 is forced with the rubber of the camel-back 12 into the outer portions of the tread forming recesses of the matrices 20. On completion of the vulcanization the pressure within the inflated bag 22 is released and the mold rings 18 and steel rim opened after which the tire 10 with its newly molded tread material may be removed. The steel shreds of the steel wool 14 will be, as indicated in Figs. 2 and 5, concentrated adjacent the outer or road contacting surface 28 of the tire 10 and will not in any way interfere with the vulcanizing of the camel-back material 12 to the tire shoe 10.

Figure 1:
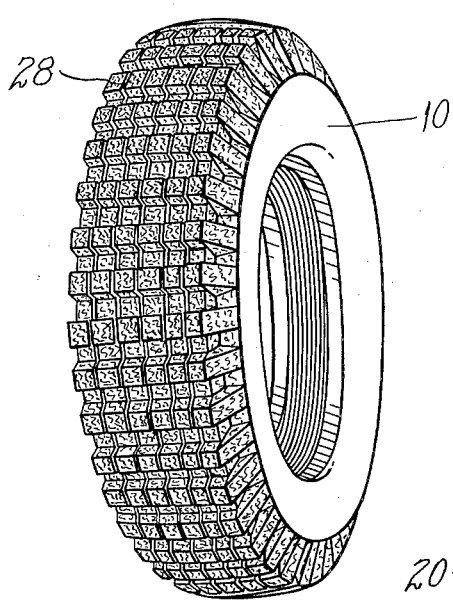
Fig. 1 is a perspective view of a complete tire provided with a characteristic form of tread made according to and embodying the present invention.

Any desired tread surface or surfaces may be formed on the tire 10, those shown in Fig. 1 being one preferred or standard form having small rectangular projections each separated from the other so that small gripping areas individually separated from the others are provided uniformly distributed over the tread surface of the tire. In the outer portions of these projections will be concentrated the shredded metal particles to form the anti-skidding and gripping elements in the tread.

The shredded steel 14 is extremely light and adds but slightly to the total weight of the tire. It is also uniformly distributed over the road gripping surface circumferentially and transversely of the tire. As the steel shreds 14 are applied to the tire body 10 over the tread forming material 12 the shreds of steel are concentrated at the periphery of the tire tread surface.

I claim as my invention:

1. The process of making a non-skid tire, comprising wrapping around the body portion of a tire a semi-vulcanized strip of rubber to form a tread, attaching said tread forming strip to said body portion, wrapping a strip of loosely intermeshing elongated shredded steel around said strip of rubber, securing said shredded steel to said tread forming strip, placing said wrapped tire in a mold and vulcanizing said tread forming rubber to said body portion with said shredded steel incorporated in the outer portions of said tread.

2. The process of making a non-skid tire, comprising, wrapping around the body portion of a tire a strip of semi-vulcanized rubber to form a tread, loosely wrapping a layer of steel wool around said tread, placing said wrapped tire within a mold with the steel wool in contact with the matrix surfaces, and completing the vulcanizing of said tread to the body portion in said mold, whereby said steel wool will become embedded within the outer portions of said tread portion.

3. The process of making a non-skid tire, comprising wrapping around the body portion of a tire a strip of uncured rubber and a strip of loosely intermeshed shredded steel, placing said wrapped tire in a tread forming mould and vulcanizing the rubber strip to said tire body, said vulcanizing incorporating the shredded steel into the outer portion of the tire tread.

JOSEPH A. JOHNSON.

REFERENCES CITED

The following references are of record in the file of this patent:

UNITED STATES PATENTS

| Number | Name | Date |
| --- | --- | --- |
| Re. 23,135 | Gapen | July 19, 1949 |
| Re. 23,235 | Hawkinson | May 30, 1950 |
| 692,397 | Wilkinson | Feb. 4, 1902 |
| 793,181 | Crane | June 27, 1905 |
| 1,021,171 | Ward | Mar. 26, 1912 |
| 1,083,231 | Wale | Dec. 30, 1913 |
| 1,088,845 | Stromeyer | Mar. 3, 1914 |
| 1,111,419 | Wadsworth | Sept. 22, 1914 |
| 1,112,772 | Crane | Oct. 6, 1914 |
| 1,175,624 | Fawkes | Mar. 14, 1916 |
| 1,290,576 | Kendall | Jan. 7, 1919 |
| 1,553,438 | Gauntt | Sept. 15, 1925 |
| 1,896,574 | Covey | Feb. 7, 1933 |
| 2,006,038 | Yamaki | June 25, 1935 |
| 2,207,100 | Maynard | July 9, 1940 |
| 2,297,354 | Hawkinson | Sept. 29, 1942 |

FOREIGN PATENTS

| Number | Country | Date |
| --- | --- | --- |
| 20,820 | Great Britain | Feb. 2, 1911 |

OTHER REFERENCES

Scientific American, "Non Skid," May 1943, pp. 224 and 225.